UNITED STATES PATENT OFFICE.

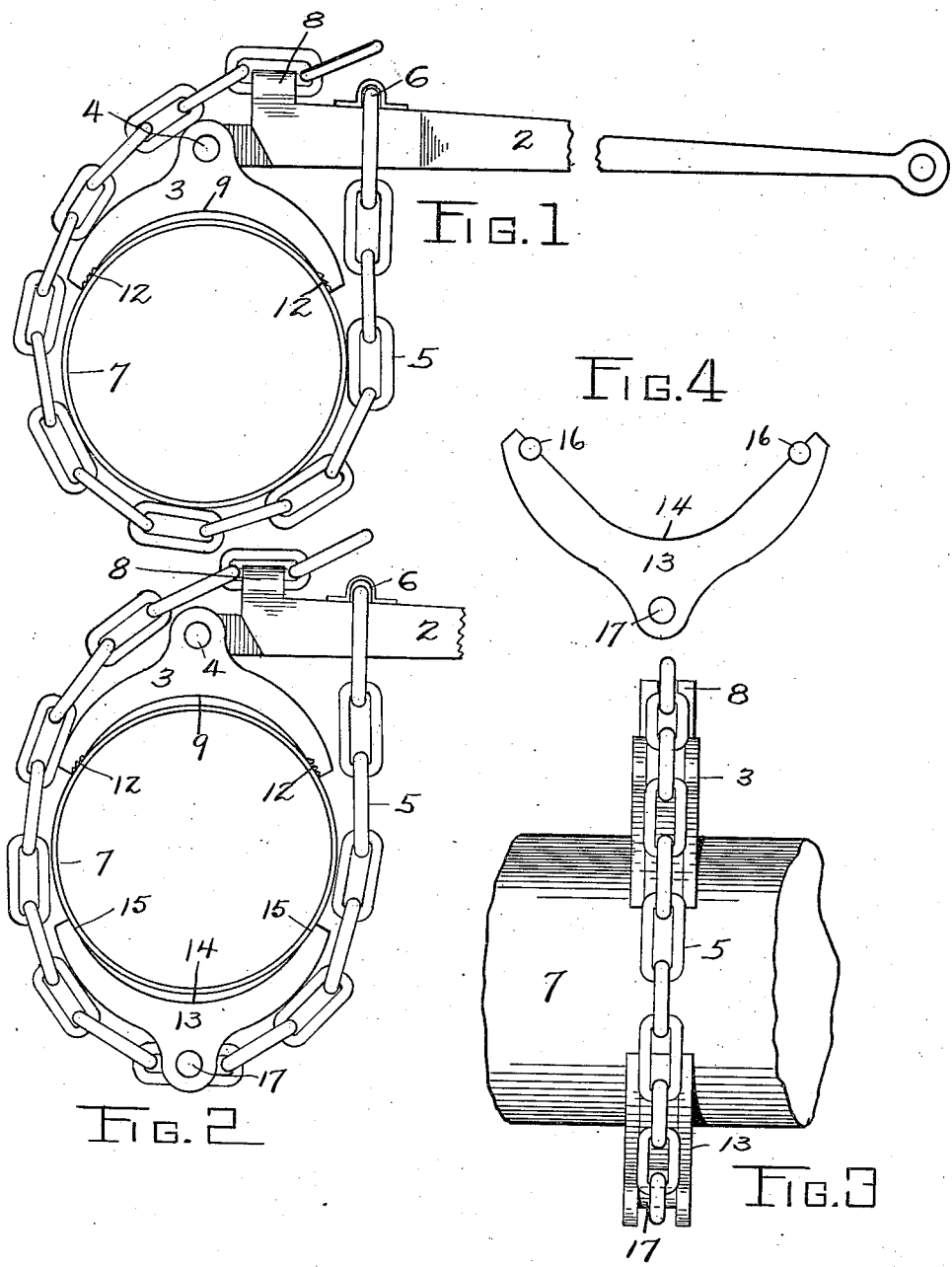

EUGENE J. BATES, OF SAN LUIS OBISPO, CALIFORNIA.

CASING-TONGS.

1,019,120.  Specification of Letters Patent.  Patented Mar. 5, 1912.

Application filed March 7, 1911. Serial No. 612,884.

*To all whom it may concern:*

Be it known that I, EUGENE J. BATES, a citizen of the United States, and a resident of San Luis Obispo, county of San Luis Obispo, and State of California, have invented certain new and useful Improvements in Casing-Tongs, of which the following is a specification.

The invention relates to casing tongs which are used to screw together lengths of casing or drive pipe, such as is used in oil wells to preserve the hole, and for other purposes. The theory and mode of operation of tongs of this description varies in a very marked degree from the theory and mode of operation of smaller pipe wrenches and tongs. The forces expended in screwing two lengths of casing or drive pipe together are so great that a new law of operation is brought into play.

The object of the invention is to provide casing tongs which by virtue of their construction grip and hold the casing in a new and novel manner.

Another object of the invention is to provide casing tongs which, when power is applied to the handle, force the casing slightly out of round so that the jaw or jaws engage in a depression in the casing.

A further object of the invention is to provide a jaw for the casing tongs which engages with the casing only at two points spaced apart at an angle greater than ninety degrees.

Another object of the invention is to provide means for concentrating the pressure at that part of the casing which is generally engaged by the chain, at one or two points so that the bulging or distortion of the casing is increased and the pipe shaped to afford an increased grip.

Heretofore, as far as I am aware, all casing tongs depended for their grip on the casing on serrated edges which bit into the casing. According to my invention, I employ a supplementary grip, caused by forcing the casing slightly out of round, so that the bulge occurs between the ends of the jaw, and by forming the jaw to accommodate this bulge. As a means of increasing this bulging effect and thereby increasing the grip on the casing, I employ a jaw-like member, which I have termed a concentrator. This concentrator acts to concentrate the forces which are exerted in opposition to the gripping jaw on one or two points, so spaced that these forces coact with the forces exerted by the jaw to cause a distortion or bulging of the casing. It is understood, however, that this bulging is very slight, but is sufficient to provide a grip so that the tongs will not slip under the most adverse circumstances.

The jaw and the concentrator are constructed to cause the casing to bulge and may also be formed to limit such bulging by allowing the casing to come in contact with the depressed portion after the casing has been distorted to a sufficient degree to afford an adequate grip. This will not mar or dent the casing, and after the pressure is released, it springs back to its normal shape. The function of the jaw, therefore, is not only to cause a bulging of the casing, but to limit and form such bulging so that the casing will not become permanently distorted, and the function of the concentrator is to increase the effect of the jaw.

I have found by experiment that tongs provided with one jaw of my invention in combination with the customary chain will produce the results described, but by using a concentrator arranged diametrically opposite the jaw, the distortion of the casing is increased, and a better grip is obtained. In very heavy drive pipe, I have found it desirable to use the concentrator in combination with the jaw thereby applying pressure to the pipe at four points, so placed that all the forces coact to force the casing out of round in the desired direction.

The device possesses other advantageous features, which, with the foregoing, will be set forth at length in the following description where I shall outline in full that form of my invention which I have selected for illustration in the drawings accompanying and forming part of the present specification. The novelty of the invention will be included in the claims succeeding said description. From this it will be apparent that I do not restrict myself to the showing made by such drawings and descriptions as I may adopt many variations within the scope of my invention as expressed in said claims.

Referring to the drawings: Figure 1 is a side elevation of the tongs of my invention applied to a casing, part of the handle being broken away to reduce the size of the figure. Fig. 2 is a side elevation of the tongs of my invention showing one form of concentrator placed diametrically opposite the jaw. Fig. 3 is an end view of the tongs as shown in Fig. 2. Fig. 4 is a view of a modification of the concentrator.

The tongs in the most simple form consist of the handle 2 to which the jaw 3 is pivotally attached by the pin 4. A chain 5 attached to the handle at 6 passes around the casing 7 and is secured at the other end in the keeper 8. The point of attachment 6 being farther removed from the pin 4 than the keeper 8, an upward movement of the handle 2 will tighten the chain and pull the jaw 3 tightly against the casing 7. The pin 4 is removable so that jaws of various sizes may be used with the same handle, depending on the size of the casing to be operated on.

The jaw 3 is formed to span an arc in excess of ninety degrees and preferably an arc of 120 degrees, although such latter span may be varied within certain limits. The face 9 of the jaw, with the exception of the areas 12 at the ends, is depressed below the line of the circumference of the casing so that the jaw will bear against the casing only at the areas 12. These areas may be serrated in order to improve the grip of the jaw on the casing.

When the handle is moved to apply pressure on the casing, the pressure is applied at the two areas 12 which are spaced apart at an angle greater than ninety degrees, and around the lower half of the casing by the chain 5. On account of the peculiar application of the pressure, the casing is compressed side-wise, so that that part which lies between the portions 12 of the jaw is forced slightly into the depression in the jaw, thereby giving the jaw an added grip on the casing. The depression in the face of the jaw may be formed to limit the amount of bulge on the casing, so that the casing will not become permanently deformed if the applied pressure is excessive. In the ordinary jaw which is concentric with the casing, the gripping effect is obtained by the teeth on the face of the jaw, and when these teeth become worn, the gripping effect is lost. By the use of the jaw of my invention, however, the jaw does not depend entirely on the teeth for its grip, with the result that the jaw is effective after the teeth have been worn down.

In the construction shown in Fig. 1, the chain bears evenly over the half circumference of the casing, leaving the distorting of the casing to be accomplished by the jaw 3. I find, however, that by using a supplementary jaw, or concentrator, 13, of similar construction to jaw 3, diametrically opposite to jaw 3, the casing is more readily distorted or bent out of round. The concentrator 13 preferably spans an arc greater than ninety degrees and is provided with the depressed face 14 and the surfaces 15 which bear against the casing. These surfaces may either be smooth or serrated as desired. In Fig. 4 I have shown a modification of concentrator 13 wherein I have employed rollers 16 which engage the casing at points spaced apart greater than ninety degrees. The concentrators 13 may be provided with a pin 17 which is adapted to be engaged by a link of the chain.

By using the jaw and the concentrator, the pressure is applied to the casing at four points, the points on opposite sides of the vertical axis being closer together than the points on the opposite sides of the horizontal axis. The greatest pressure, therefore, is exerted along the horizontal axis with the effect of elongating the vertical axis and pressing the casing out of round and into the depressions in the faces of the jaws. The effect of concentrating the pressure at points spaced apart also causes the teeth on the jaw to take a firmer grip on the casing, which produces the obvious advantageous results.

I claim:

1. A casing tongs comprising a jaw provided with gripping portions which are arranged to primarily engage a casing at two points spaced apart at an angle greater than ninety degrees, the jaw having its face between the gripping portions regularly curved but slightly depressed from the surface of the casing and adapted to support the same when temporarily distorted by application of pressure, a handle to which said jaw is connected, and a tension member connected with the handle and adapted to pass around the casing.

2. A casing tongs comprising a jaw provided with gripping portions spaced to primarily engage a casing at points separated a substantial distance thereon and an intermediate curved face to receive and support the casing when temporarily distorted on application of pressure, a similar supplemental jaw having gripping portions spaced to engage the casing at points substantially diametrically opposite the points of engagement of the first mentioned jaw, and tension means for forcing said jaws against the casing.

3. A casing tongs comprising opposed jaws each having similarly spaced gripping points and intermediate curved depressions to receive the distorted portions of a casing when pressure is applied thereto, a handle connected to one jaw and a tension member connecting the handle and the other jaw and arranged to pass around the casing, the adjacent gripping points of opposite jaws being closer together than the points on each jaw are to one another when the jaws engage a casing of normal size, whereby the casing will be distorted by elongation in a direction to enter the depressions.

EUGENE J. BATES.

Witnesses:
CHARLES ILGIATI,
H. O. FRY.